United States Patent
Wang

(10) Patent No.: US 9,845,254 B2
(45) Date of Patent: Dec. 19, 2017

(54) OZONE SPARKLING WATER SUPPLY APPARATUS AND FLUID PRESSURE SWITCH THEREOF

(71) Applicant: GEANN INDUSTRIAL CO., LTD., Lukang Township, Changhua County (TW)

(72) Inventor: Shiang-Shih Wang, Changhua County (TW)

(73) Assignee: GEANN INDUSTRIAL CO., LTD., Lukang Township, Changhua County (TW)

( * ) Notice: Subject to any disclaimer, the term of this patent is extended or adjusted under 35 U.S.C. 154(b) by 104 days.

(21) Appl. No.: 15/136,583

(22) Filed: Apr. 22, 2016

(65) Prior Publication Data

US 2017/0305770 A1    Oct. 26, 2017

(51) Int. Cl.
   *C02F 1/78*       (2006.01)
   *C01B 13/10*      (2006.01)
   *C02F 1/00*       (2006.01)
   C02F 103/04      (2006.01)

(52) U.S. Cl.
   CPC ............ *C02F 1/78* (2013.01); *C01B 13/10* (2013.01); *C02F 1/008* (2013.01); *C02F 2103/04* (2013.01); *C02F 2201/782* (2013.01); *C02F 2209/03* (2013.01); *C02F 2303/04* (2013.01); *C02F 2307/06* (2013.01)

(58) Field of Classification Search
   CPC ...... C02F 1/78; C02F 1/008; C02F 2201/782; C02F 2209/03; C02F 2307/06; C02F 2103/04; C02F 2303/04
   See application file for complete search history.

(56) References Cited

U.S. PATENT DOCUMENTS 6,030,586 A * 2/2000 Kuan .................... B01F 5/0413
                                                204/230.8

FOREIGN PATENT DOCUMENTS

JP          04244198 A    *    9/1992

OTHER PUBLICATIONS

Abstract and Figure of CN 2858631Y, Liang, J. (Year: 2007).*
Abstract and Figure of CN 102116225A, Chen, G. (Year: 2011).*
Abstract and Figure of TW 586920A, Li, S. (Year: 2004).*

* cited by examiner

*Primary Examiner* — Terry K Cecil
(74) *Attorney, Agent, or Firm* — Egbert Law Offices, PLLC

(57) ABSTRACT

An ozone sparkling water supply apparatus includes a water supply and an ozone generator, wherein the ozone generator is communicated with the water supply via a first pipe. The ozone generator includes a main processor, a sensor electrically connected to the main processor and a fluid pressure switch communicated with the main processor via a second pipe, wherein the sensor and the fluid pressure switch correspond to each other. The fluid pressure switch starts the ozone generator for providing ozone into the water supply such that the water supply is capable of providing ozone sparkling water when the ozone is mixed into the water in the water supply.

10 Claims, 6 Drawing Sheets

OZONE SPARKLING WATER SUPPLY APPARATUS AND FLUID PRESSURE SWITCH THEREOF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a water supply apparatus, and more particularly to an ozone sparkling water supply apparatus.

2. Description of Related Art Including Information Disclosed Under 37 CFR 1.97 and 37 CFR 1.98

Ozone ($O_3$) is an allotrope of oxygen ($O_2$). As well know, the ozone includes the functions of disinfecting, breaking down toxins and deodorant such that the ozone is widely used for purifying air and water.

The marketed ozone generator has multiple patterns. However, the popular pattern of the ozone generator is mounted onto the faucet for purifying running water.

The conventional current sensing switch of the ozone generator has some problems that need to be advantageously altered. For example, the conventional current sensing switch in accordance with the prior art is a magnetic reed switch mounted in a passageway of the faucet and has a fixed magnet and a movable magnet. The conventional current sensing switch may reduce the cross-section of the passageway and the flow of the water. In addition, the impurities may adhere on the movable magnet such that the movable magnet may not be smoothly moved. Furthermore, the fixed magnet is soaked in the water over a long period of time and possibly causes water pollution.

The present invention has arisen to mitigate and/or obviate the disadvantages of the conventional current sensing switch of the ozone generator.

BRIEF SUMMARY OF THE INVENTION

The main objective of the present invention is to provide an improved ozone sparkling water supply apparatus with a fluid pressure switch.

To achieve the objective, the ozone sparkling water supply apparatus in accordance with the present invention comprises a water supply including a passageway defined therein and an ozone generator communicated with the passageway in the water supply via a first pipe. The ozone generator includes a main processor, a sensor electrically connected to the main processor and a fluid pressure switch communicated with the main processor via a second pipe that communicates with the main processor, wherein the sensor and the fluid pressure switch correspond to each other. The fluid pressure switch comprises an upright main body including a through hole longitudinally defined therein, wherein the through hole has an enlarged portion defined in an upper end thereof and the enlarged portion corresponds to the sensor. The enlarged portion has two parallel sidewalls. A plug partially is inserted into a lower end of the through hole in the main body. The plug includes a first path longitudinally defined therein and extending therethrough, wherein the first path is communicated with the through hole in the main body. A cover is mounted into an upper end of the through hole in the main body for closing the enlarged portion. The cover includes a second path defined therein, wherein the second path has two opposite ends respectively communicating with the enlarged portion and the second pipe. A magnetic element is movably received in the through hole in the main body, wherein the magnetic element is reciprocally moved between the plug and the cover. The magnetic element is columnar and includes an axis being vertical to the two parallel sidewalls of the enlarged portion in the main body. The magnetic element is moved into the enlarged portion when the fluid quickly passes through the passageway and the sensor selectively starts the ozone generator when sensing the magnetic element moved into the enlarged portion.

Further benefits and advantages of the present invention will become apparent after a careful reading of the detailed description with appropriate reference to the accompanying drawings.

DETAILED DESCRIPTION OF THE INVENTION

Figure 1:
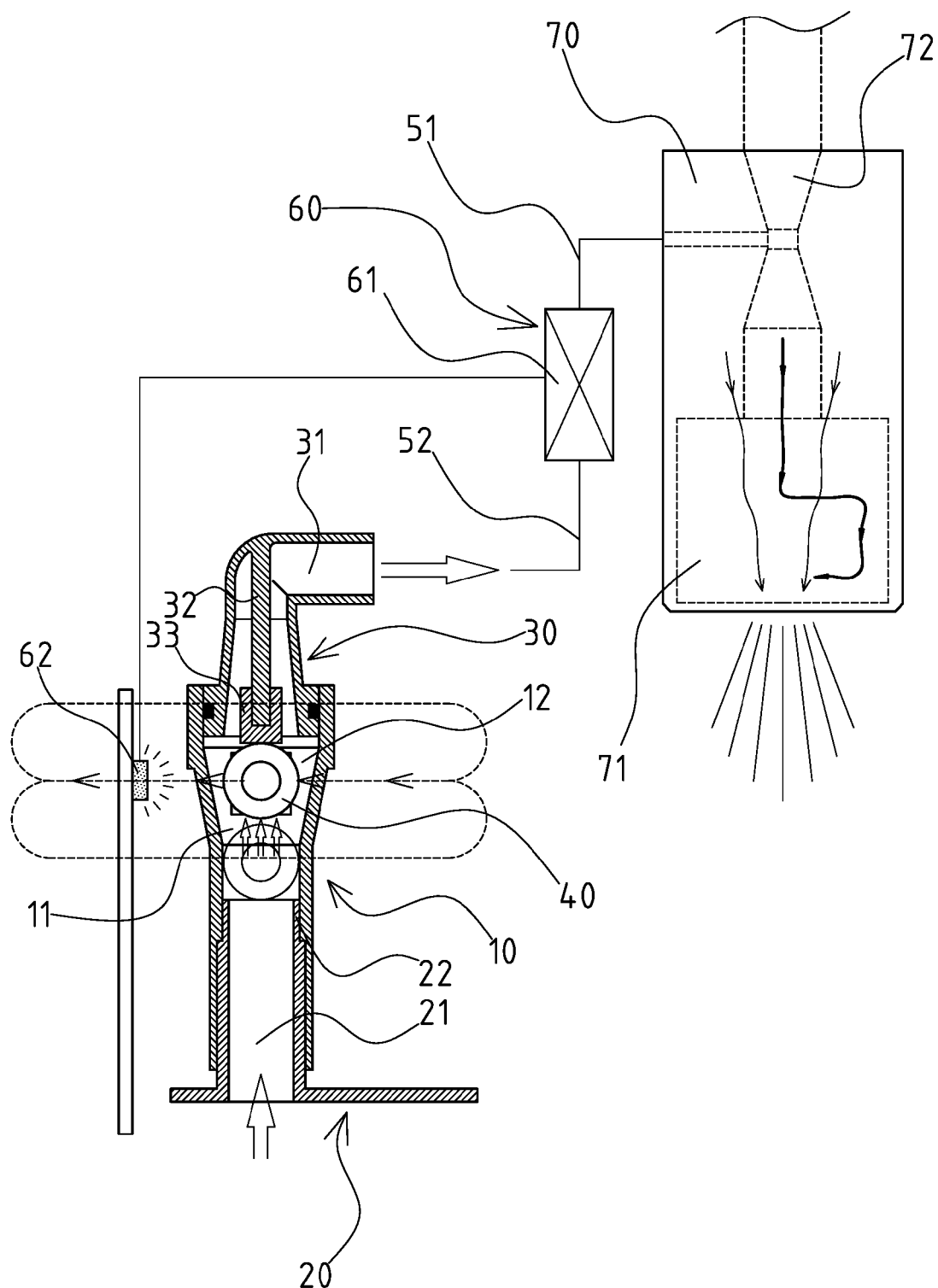
FIG. 1 is an operational view of an ozone sparkling water supply apparatus in accordance with the present invention.
Figure 2:
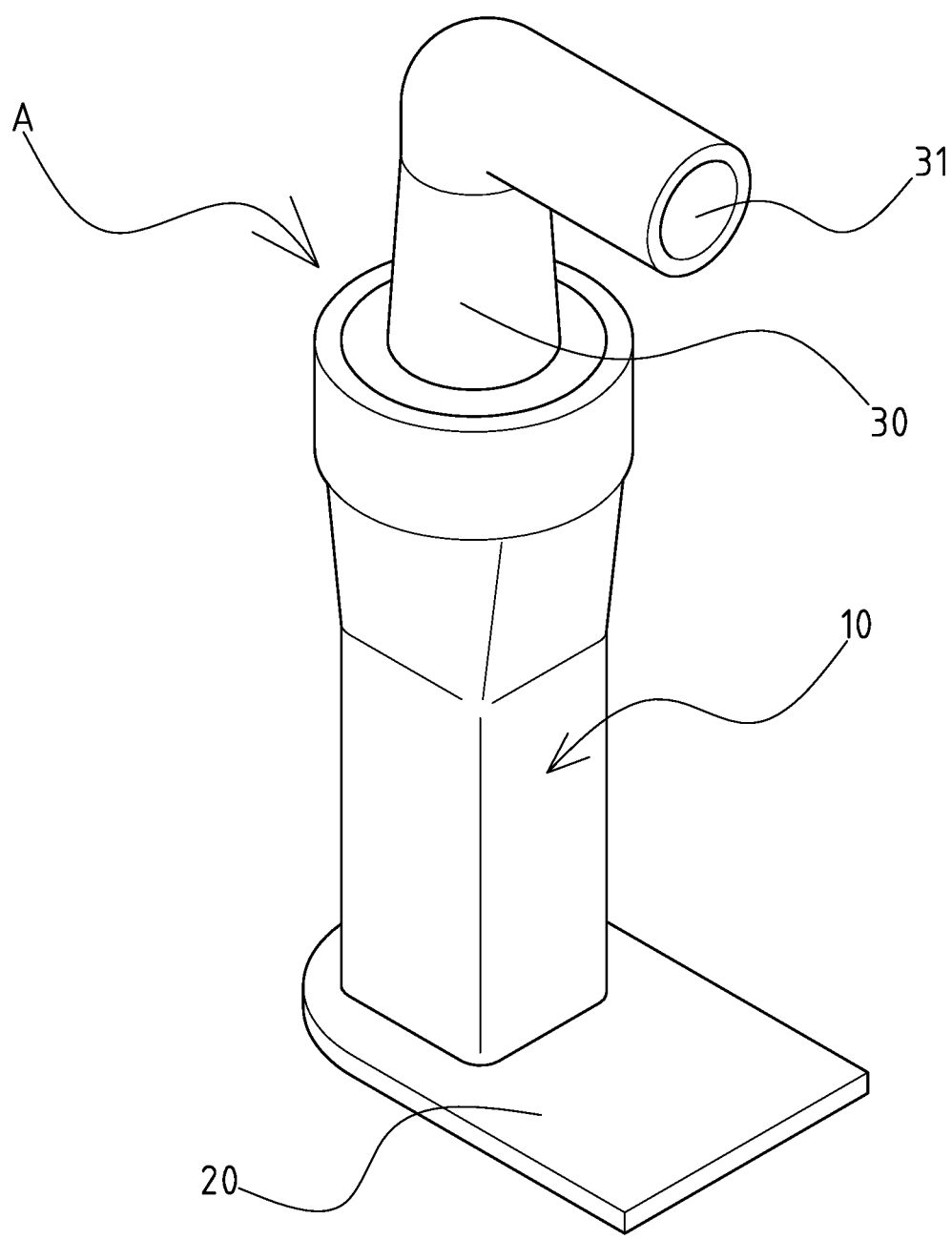
FIG. 2 is a perspective view of a fluid pressure switch of the ozone sparkling water supply apparatus in accordance with the present invention.
Figure 3:
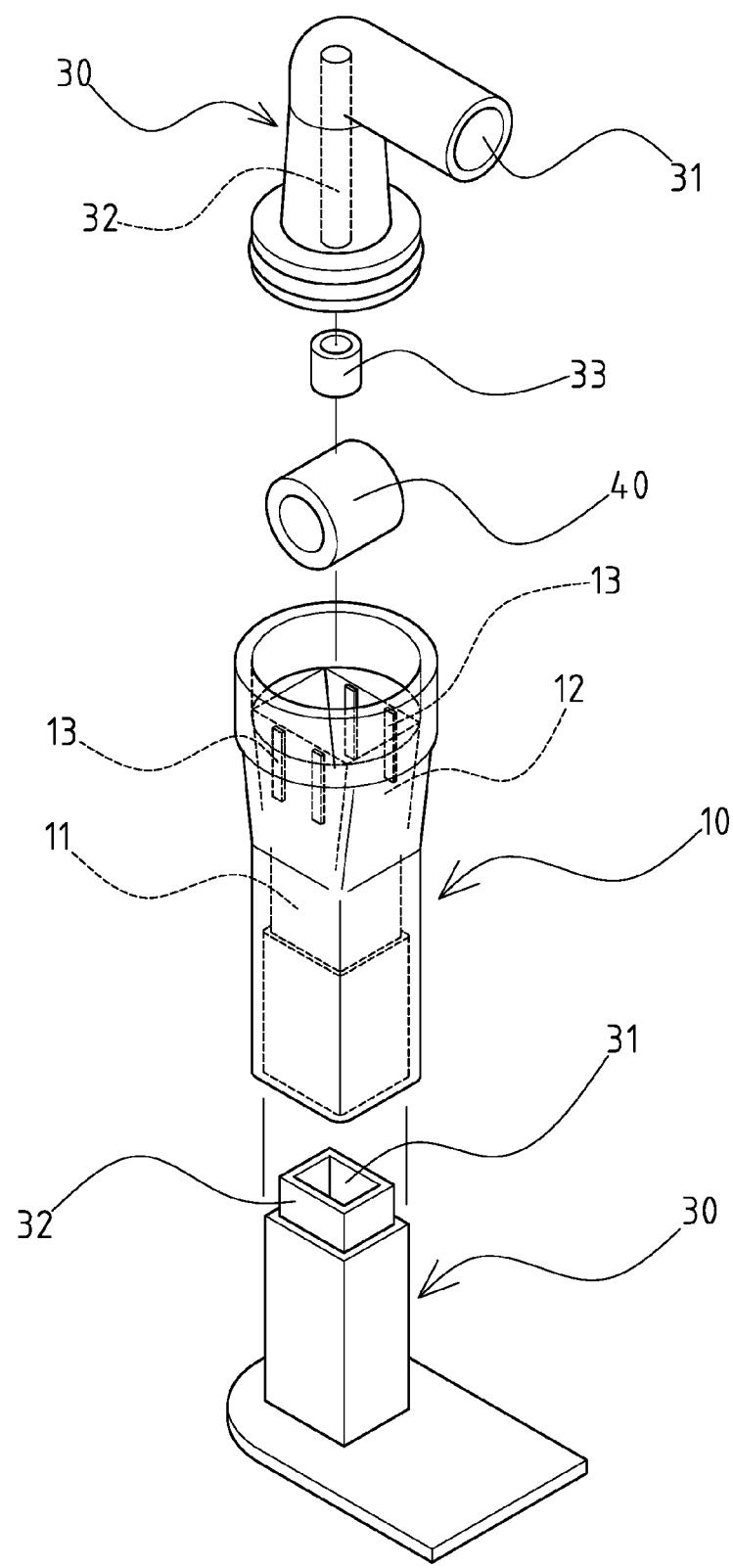
FIG. 3 is an exploded perspective view of the fluid pressure switch in FIG. 2.

Referring to the drawings and initially to FIG. 1, an ozone sparkling water supply apparatus in accordance with the present invention comprises a water supply 70 and an ozone generator 60, wherein the ozone generator 60 is communicated with the water supply 70 via a first pipe 51. The ozone generator 60 includes a main processor 61, a sensor 62 electrically connected to the main processor 61 and a fluid pressure switch A communicated with the main processor 61 via a second pipe 52 that communicates with the main processor 61, wherein the sensor 62 and the fluid pressure switch A correspond to each other. In the preferred embodiment of the present invention, the water supply 70 is a gooseneck faucet, and the ozone generator 60 and the fluid pressure switch A is disposed in the water supply 70 for providing a hiding effect and reduced the total volume of the water supply 70.

The water supply 70 includes a passageway 72 defined in the water supply 70 and a mixing chamber 71 is defined in a distal end of the passageway 72, wherein the passageway 72 has an effect of venturi tube and communicates with the first pile 51.

The fluid pressure switch A includes a main body 10, a plug 20 partially inserted into a lower end of the through hole 11 in the main body 10, a cover 30 mounted into an upper end of the through hole 11 in the main body 10 and a magnetic element 40 movably received in the main body 10, wherein the magnetic element 40 is reciprocally moved between the plug 20 and the cover 30.

As usual, the main body 10 is uprightly assembled. The main body 10 includes a through hole 11 longitudinally defined therein, wherein the through hole 11 has an enlarged portion 12 defined near the cover 30. The enlarged portion 12 is tapered relative to the plug 20 and has two opposite parallel sidewalls respectively having at least one rib 13 formed thereon.

The plug 20 includes a first path 21 longitudinally defined therein and extending therethrough, wherein the first path 21 is communicated with the through hole 11 in the main body 10. A hollow protrusion 22 longitudinally extends from an upper end of the plug 20, wherein the length of the protrusion 22 is decided relative to the sensitivity of the fluid pressure switch A. in the preferred embodiment of the present invention, the plug 20 is made of flexible material.

The magnetic element 40 is columnar including an axis being vertical to the two parallel sidewalls of the enlarged portion 12 in the main body 10. The ribs 13 can reduce the contract area between the magnetic element 40 and the enlarged portion 12 for reducing the friction between the magnetic element 40 and the main body 10. In addition, for reducing the weight of the magnetic element 40 and promoting a moving sensitivity of the magnetic element 40, the magnetic element 40 is a hollow structure.

The cover 30 includes a second path 31 defined therein. The second path 31 has two opposite ends respectively communicating with the enlarged portion 12 and the second pipe 52. The cover 30 includes a stub 32 extending therefrom toward the enlarged portion 12 via the second path 31 for limiting an upward stroke of the magnetic element 40, wherein a rubber cap 33 is mounted onto a free end of the stub 32.

Figure 4:
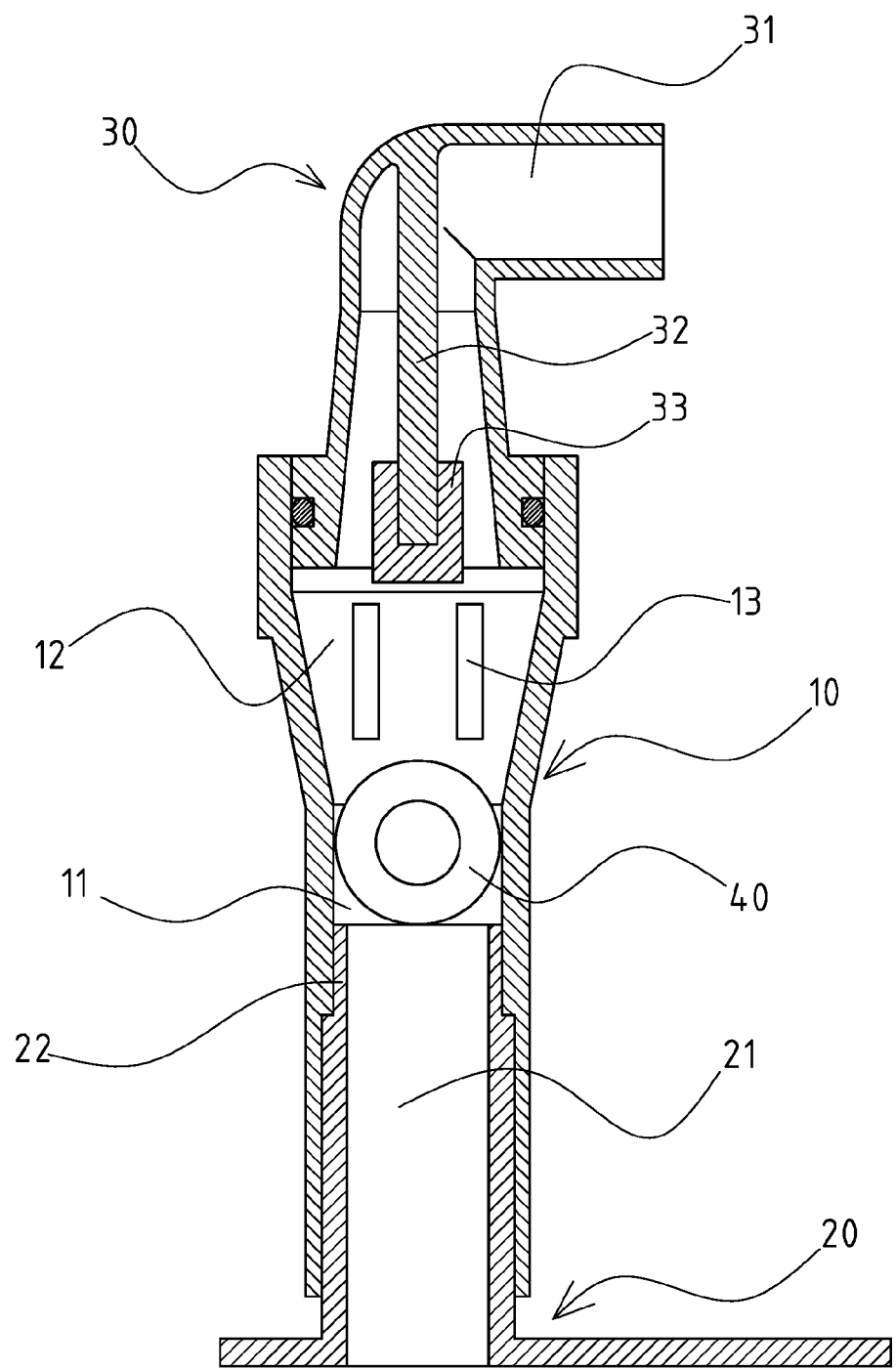
FIG. 4 is a cross-sectional view of the fluid pressure switch in FIG. 2.
Figure 5:
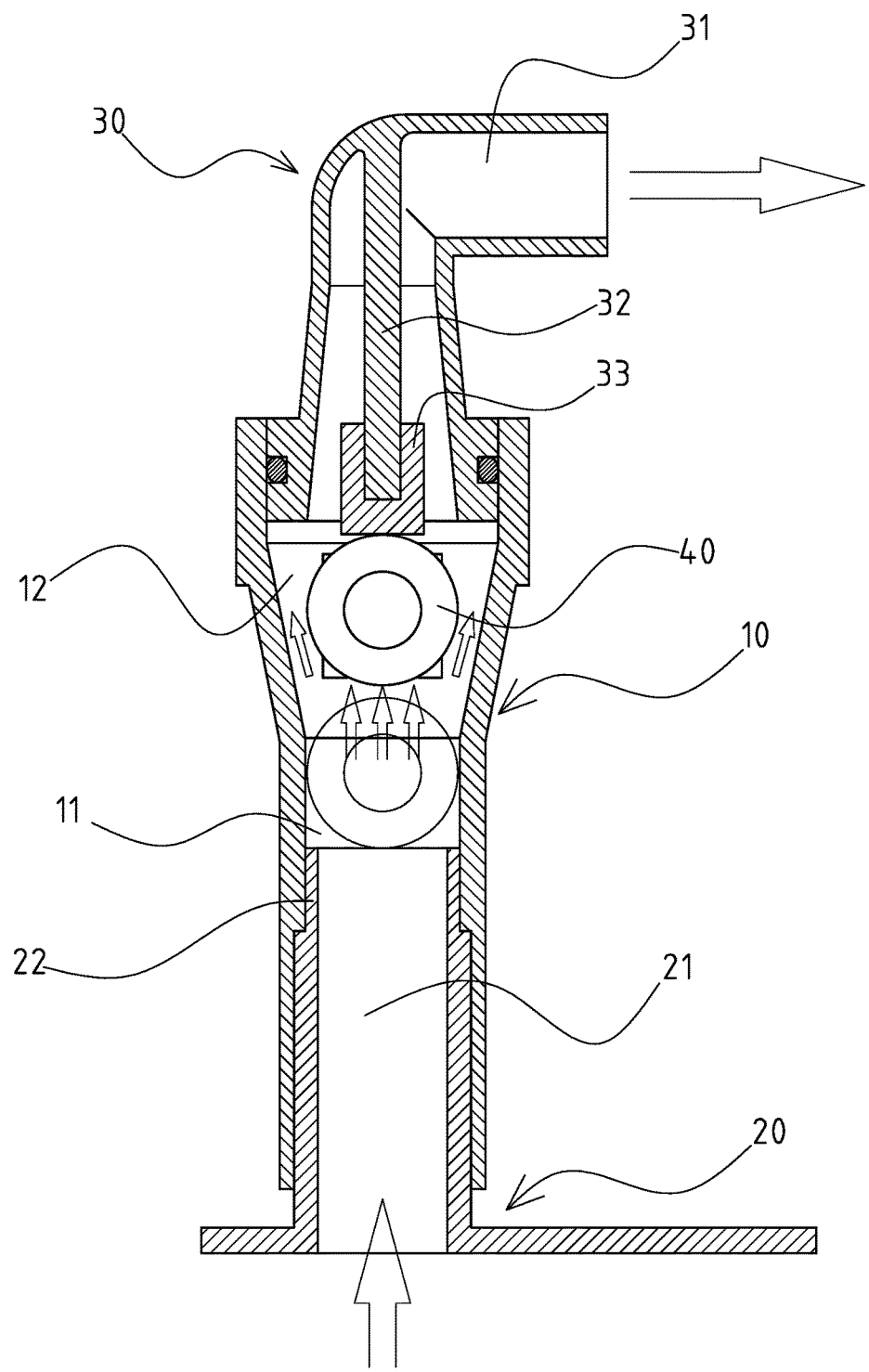
FIG. 5 is an operational view of the fluid pressure switch in FIG. 2.

With reference to FIGS. 1, 4 and 5, the magnetic element 40 is downward moved to a free end of the protrusion 22 due to the gravity thereof when the water supply 70 is closed. The water quickly passes through the passageway 72 and forms a negative pressure due to the Venturi tube effect or Bernoulli's principle when the water supply 70 is opened for providing water. The pressure in the main body 10 is smaller than the atmospheric pressure when the negative pressure is transferred into the main body 10 via the first pipe 51 and the second path 31 in the cover 30. Consequently, the external air flows into through hole 11 the main body 10 via the first path 21 in the plug 20 such that the magnetic element 40 is pushed into the enlarged portion 12 of the through hole 11 in the main body 10, wherein the moved magnetic element 40 is stopped by the free end of the stub 32. The sensor 62 sends a signal to start the ozone generator 60 for forming ozone that is transferred into the mixing chamber 71 for providing the functions of cleaning water and disinfecting when the sensor 62 senses the magnetic element 40. The stub 32 stops the magnetic element 40 and makes the magnetic element 40 corresponding to the sensor 62 such that the sensor 62 continually senses the magnetic element 40 and the ozone generator 60 is continually operated when aquifer yield is suddenly increased or the water supply 70 continually supplies water.

The water in the passageway 72 is stopped and the negative pressure is disappeared when the water supply 70 is closed. The pressure in the main body 10 is raised and balanced to the atmospheric pressure such that the magnetic element 40 is moved to its original position on the free end of the protrusion 22 when the negative pressure in the main body 10 is disappeared. The parallel sidewalls of the enlarged portion 12 may contract with the opposite ends of the magnetic element 40 when the water supply 70 is opened. However, the ribs 13 on the periphery of the enlarged portion 12 greatly reduce the contract area between the magnetic element 40 and the periphery of the enlarged portion 12, and the friction force between the magnetic element 40 and the main body 10 is minimized and the reset time of the magnetic element 40 is minimized. Accordingly, the ozone generator 60 is immediately stopped when the water supply 70 is closed for preventing the ozone generator 60 from a waste of energy and a leak of ozone such that the operate safety of present invention is promoted.

By using the rubber cap 33 and the protrusion 22 made of flexible material, the moving magnetic element 40 is buffered and the noise is eliminated when the moving magnetic element 40 repeatedly hits the protrusion 22 and the free end of the stub 32.

In addition, the protrusion 22 is previously maintained a great length before being assembled such that the technical staff prune the length of the protrusion 22 relative to the velocity of fluid and the pressure of the water in the passageway 72 for adjusting the moving range of the magnetic element 40 and the Sensitivity of the fluid pressure switch A in accordance with the present invention.

Figure 6:
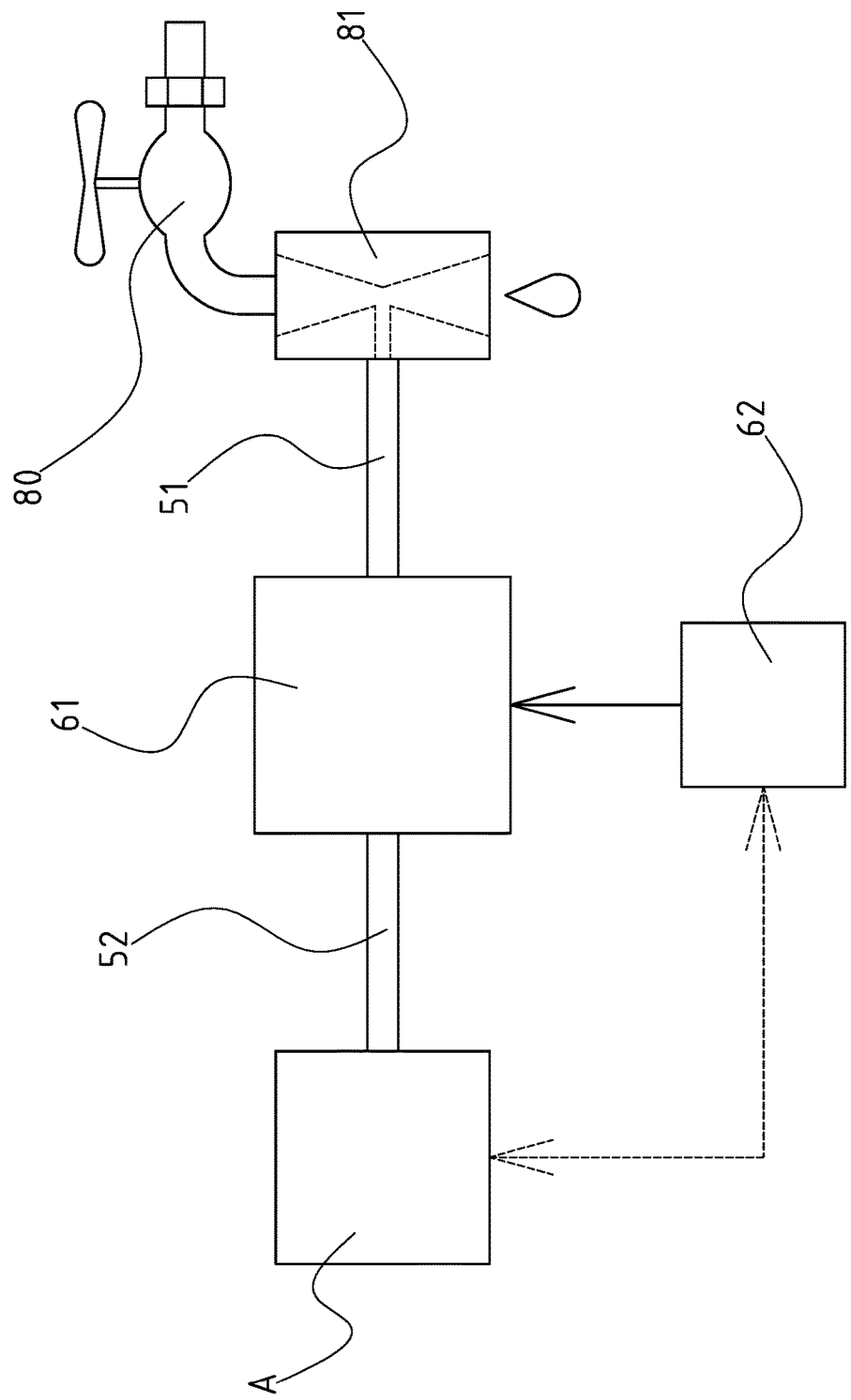
FIG. 6 is a schematic view for showing the present ozone generator that is mounted to a conventional faucet.

With reference to FIG. 6, the fluid pressure switch A not only is installed in the gooseneck faucet as described above and also mounted onto a conventional faucet for enlarging the using scope of the fluid pressure switch A in accordance with the present invention. A water pipe 81 including a venturi tube structure is mounted onto the conventional faucet 80 (as the water supply 70 of the above first embodiment of the present invention), wherein the other connections and structures of fluid pressure switch A, the magnetic element 40 and the ozone generator 60 are the same as that of the first embodiment hereinbefore.

As described above, the fluid pressure switch A in accordance with the present invention has the following advantages. The magnetic element 40 of the present invention can be immediately reset and stops the ozone generator 60 for preventing the ozone generator 60 from a delayed action such that the sensitivity of the fluid pressure switch A in accordance with the present invention is promoted. Furthermore, the moving magnetic element 40 is buffered and the noise is eliminated when the moving magnetic element 40 repeatedly hits the protrusion 22 and the free end of the stub 32, and the length of the protrusion is adjusted due to the operation environment.

Although the invention has been explained in relation to its preferred embodiment, it is to be understood that many other possible modifications and variations can be made without departing from the spirit and scope of the invention as hereinafter claimed.

I claim:

1. An ozone sparkling water supply apparatus comprising:
a water supply including a passageway defined therein; and
an ozone generator communicated with the passageway in the water supply via a first pipe; the ozone generator including a main processor, a sensor electrically connected to the main processor and a fluid pressure switch communicated with the main processor via a second pipe that communicates with the main processor, wherein the sensor and the fluid pressure switch correspond to each other;
the fluid pressure switch including:
an upright main body including a through hole longitudinally defined therein, wherein the through hole has an enlarged portion defined in an upper end of the through hole and the enlarged portion corresponds to the sensor, the enlarged portion having two parallel sidewalls;
a plug partially inserted into a lower end of the through hole in the main body, the plug including a first path longitudinally defined therein and extending therethrough, wherein the first path is communicated with the through hole in the main body;
a cover mounted into an upper end of the through hole in the main body and closing the enlarged portion, the cover including a second path defined therein, wherein the second path has two opposite ends respectively communicating with the enlarged portion and the second pipe;
a magnetic element movably received in the through hole in the main body, wherein the magnetic element is reciprocally moved between the plug and the cover, the magnetic element being columnar and including an axis being vertical to the two parallel sidewalls of the enlarged portion in the main body, the magnetic element moved into the enlarged portion when the fluid quickly passes through the passageway and the sensor selectively starting the ozone generator when sensing the magnetic element moved into the enlarged portion.

2. The ozone sparkling water supply apparatus as claimed in claim 1, wherein the plug includes a hollow protrusion longitudinally extending from an upper end thereof and having a length for adjusting the original position of the magnetic element, and the cover includes a stub extending therefrom toward the enlarged portion via the second path for limiting an upward stroke of the magnetic element.

3. The ozone sparkling water supply apparatus as claimed in claim 2, wherein the protrusion is made of flexible material and the cover includes a rubber cap mounted onto a free end of the stub such that the moving magnetic element is buffered and the noise is eliminated when the moving magnetic element repeatedly hits the protrusion and the free end of the stub.

4. A fluid pressure switch of a ozone sparkling water supply apparatus, comprising:
an upright main body including a through hole longitudinally defined therein, wherein the through hole has an enlarged portion defined in an upper end of the through hole;
a plug partially inserted into a lower end of the through hole in the main body, the plug including a first path longitudinally defined therein and extending therethrough, wherein the first path is communicated with the through hole in the main body;
a cover mounted into an upper end of the through hole in the main body and closing the enlarged portion, the cover including a second path defined therein and communicating with the enlarged portion, the second path adapted to be communicated with a fluid passageway;
a magnetic element movably received in the through hole in the main body, wherein the magnetic element is moved between the plug and the cover; and
a sensor corresponding to the enlarged portion, wherein the magnetic element is moved into the enlarged portion when the fluid passes through the passageway and the sensor is adapted to selectively start an ozone generator when sensing the magnetic element moved into the enlarged portion.

5. The fluid pressure switch as claimed in claim 4, wherein the plug includes a hollow protrusion longitudinally extending from an upper end thereof and having a length for adjusting the original position of the magnetic element.

6. The fluid pressure switch as claimed in claim 4, wherein the cover includes a stub extending therefrom toward the enlarged portion via the second path for limiting an upward stroke of the magnetic element.

7. The fluid pressure switch as claimed in claim 6, wherein the protrusion is made of flexible material and the cover includes a rubber cap mounted onto a free end of the stub such that the moving magnetic element is buffered and the noise is eliminated when the moving magnetic element repeatedly hits the protrusion and the free end of the stub.

8. The fluid pressure switch as claimed in claim 7, wherein the enlarged portion has two parallel sidewalls each having at least one rib formed thereon.

9. The fluid pressure switch as claimed in claim 8, wherein the magnetic element is columnar and includes an axis being vertical to the two parallel sidewalls of the enlarged portion in the main body.

10. The fluid pressure switch as claimed in claim 9, wherein the magnetic element is a hollow structure.

* * * * *